Nov. 10, 1970   R. E. SMIDS   3,539,456
ELECTROLYTIC CELL SOLUTE DETERMINING APPARATUS AND METHOD
Filed June 25, 1968

INVENTOR.
RONALD E. SMIDS
By S. Ernest Lois
Attorney $e_i$ = Input Signal
$e_o$ = Integrated Output Signal

INVENTOR.
RONALD E. SMIDS

Nov. 10, 1970  R. E. SMIDS  3,539,456

ELECTROLYTIC CELL SOLUTE DETERMINING APPARATUS AND METHOD

Filed June 25, 1968  5 Sheets-Sheet 4

INVENTOR.
RONALD E. SMIDS
By
S. Ernest Low
Attorney

United States Patent Office 3,539,456
Patented Nov. 10, 1970

3,539,456
ELECTROLYTIC CELL SOLUTE DETERMINING APPARATUS AND METHOD
Ronald E. Smids, Renton, Wash., assignor to Aluminum Company of America, Pittsburgh, Pa., a corporation of Pennsylvania
Filed June 25, 1968, Ser. No. 739,742
Int. Cl. C22d 3/12
U.S. Cl. 204—1                                    13 Claims

ABSTRACT OF THE DISCLOSURE

An apparatus and method for use in the operation of a direct current electrolytic reduction cell in which a pair of alternating current energized electrodes, extending into the metallic oxide solute-containing fused bath of the cell, serves as a means for sensing the occurrence of cyclic anode effects induced thereon during the operation of the cell, preferably in combination with an electrically responsive readout system relating the anode effects to solute concentrations in the fused electrolyte bath of the cell as a determining or sensing factor in efficient operation of the cell.

BACKGROUND PRIOR ART

Exemplary of the prior art in the general field of the present invention is the commercial production of aluminum by electrolysis of fused cryolite-alumina salts or compounds in high amperage direct current electrolytic reduction cells employing either pre-baked or Soderberg carbon electrodes or anodes. In practice, it is usual to arrange a multiplicity of similar reduction cells in a potline, connected in series electrically, under an impressed direct current of the order of fifty thousand to one hundred thousand amperes, with a voltage drop of 4 to 6 volts across each cell tolerated in efficiently acceptable operation of a potline. Under normal operation, the fused cryolite-alumina bath in each of the cells in the potline is electrolized with aluminum being deposited at the cathodic bottom of each cell, where it is collected in the form of a molten metal pool from which it is periodically drained, and the oxygen content of the alumina combining with carbon of the anodes or electrodes to form principally carbon dioxide at the interface of each anode and fused salt bath electrolyte in each cell.

Control of dissolved alumina or solute concentration in the fused cryolite bath of an electrolytic reduction cell has been recognized as one of the principal and continuing problems in the commercial electrolytic production of aluminum. In this regard, if the concentration of the alumina solute constituent dissolved in the cryolite bath is depleted, or drops below a specified critical limit, depending primarily on the anode impressed direct current density, a phenomenon known as anode effect occurs, with consequent inefficiency of operation of a cell and undue consumption of the cell anode or anodes.

The anode effect is conventionally interrupted and a cell restored to efficient operation by breaking through the frozen top crust of the fused cryolite-alumina layer of an electrolytic aluminum reduction cell and adding alumina to the aforesaid fused layers by stirring action. It is essential, however, to avoid adding a surplus of alumina and thus produce supersaturation of the reduction cell electrolyte, since excess alumina will sink into the cathodic molten aluminum pool and cause noticable decline in the efficiency of the reduction to develop what is conventionally known as a "sick" cell.

Typical and efficient direct current energized electrolytic reduction cells for producing aluminum have been found to tolerate an alumina solute content of from an upper limit of about 7 to 10 percent down to a critical minimum of from about 0.5 to 1½ percent, at which anode effect occurs.

In allowed Bruno et al. United States application, Ser. No. 459,601, filed May 28, 1965, now Pat. No. 3,400,062, an apparatus and method is illustrated and described in which a direct current energized pilot anode, extending into and confined in its immersed depth to the electrolyte of an electrolytic reduction cell, is employed to sense solute concentration in the cell at regularly selected time intervals to thereby establish one of two alumina feed rates, in the case of an aluminum electrolytic reduction cell, in accord with the determination of each pilot anode sensing operation.

Reference to the aforesaid Bruno et al. application will reveal that a direct current energized pilot anode control system is described and illustrated therein which necessitates three time consuming separate stages of direct current energization defined in terms of (a) a standby stage in which the pilot anode is energized for multiple minute duration by an impressed high voltage direct current to produce or induce an anode effect thereon; (b) a following reversing current stage in which the direction of the direct current through the pilot anode is reversed to eliminate the standby anode effect; and (c) a following sensing stage in which a selected low voltage direct current, directionally the same as during the standby stage, is impressed on the pilot anode for up to twenty seconds duration to provide a sensing current density on the pilot anode corresponding to a desired dissolved alumina concentration in the cell electrolyte.

SUMMARY OF INVENTION

Acknowledging the problems presented by prior commercial practices, and the Bruno et al. direct current energized pilot anode apparatus and method solution thereof, the present invention is predicated upon employing alternating current energization of a pair of electrodes extending into the fused solute containing bath of an otherwise conventional direct current energized electrolytic reduction cell, whereby each electrode alternately functions as an anode and a cathode and is capable of producing one anode effect for each cycle of alternating current energization, without the necessity of periodic reversal of and intermittent cathodic operation of the direct current energized pilot anode of the Bruno et al. application, Ser. No. 459,601, filed May 28, 1965.

SPECIFICATION

In general, the invention is addressed to solute determining apparatus, and methods of employing the same, in the operation of conventional direct current energized electrolytic reduction cells. In more specific terms, and by means of employing a pair of alternating current energized electrodes, apparatus and methods are provided under the practice of the invention for establishing at least two anode effects per cycle; the anode effects so produced communicated to a readout system; and correlation by the readout system of the anode effects in terms of concentration values of the solute constituent in the fused electrolyte bath of a cell in a matter of seconds.

A principal object of the invention is to provide a new and improved method and apparatus for determining the concentration of the solute constituent in a fused electrolyte bath of a direct current electrolytic reduction cell in which anode effects detrimental to the efficiency of the cell are encountered.

Another object of the invention is to provide an alternating current energized pair of sensing electrodes extending into the fused salt-solute containing electrolyte bath of a direct current energized reduction cell, as a means and method for determining the solute concentration of the cell.

An additional object of the invention is to provide improved apparatus for determining alumina solute concentration in a conventional electrolytic reduction cell for producing aluminum by means of an alternating current energized pair of sensig electrodes associated with the cell during normal operation thereof.

Other objects and advantages of the invention, directed to improved efficiency of electrolytic reduction cells, will be understood from a consideration of the following description and drawings, in which:

Alternating current energized sensing electrodes, as well as readout mechanism integrated therewith, are hereinafter described in reference to the appended drawings, in their adaptation to the operation of a conventional direct current energized reduction cell for the production of aluminum from alumina solute charged into the cell.

In the preferred exemplary, but not limiting, practice of the invention, a pair of essentially carbon sensing electrodes are preferred and provided to extend into the fused cryolite-alumina fused liquid bath of a conventional direct current energized aluminum reduction cell. Significant in respect of the invention is the provision of an alternating current power source for energizing the electrodes for the purpose of inducing anode effects at their substantially equally wetted area interfaces within the cryolite-alumina electrolyte bath of the cell during each half cycle of the alternating current impressed thereon.

The "intensity" of so produced sensing electrode induced anode effects are integratedly communicated to a readout system in electrical circuitry with each energized sensing electrode and are correlated to alumina solute concentrations in the cell bath. By the term "intensity," as used herein, is meant a change in either voltage or current during each sensing electrode induced anode effect. Since it is only the anode oxidizing reaction in a cell that is significant, with respect to the occurrence of anode effect, an alternating current power source impressed on the sensing electrodes can induce two pilot anode effects per cycle, one on each sensing eelctrode on opposite half cycles of the impressed alternating current. Then it follows that a 60-cycle alternating current impressed on a pair of sensing electrodes would induce a total of 120 anode effects per second, which is an excessively high degree of statistical reliability.

Figure 1:
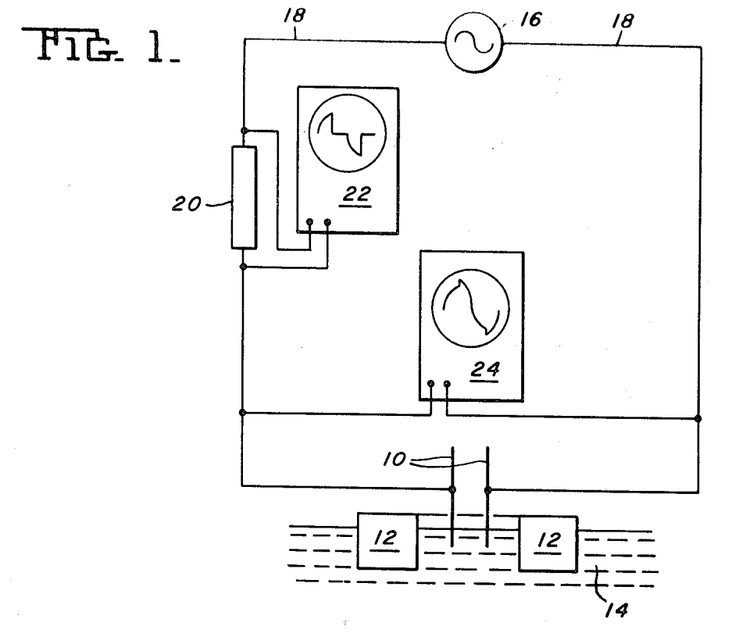
FIG. 1 represents a schematic showing of solute determining apparatus energized from an alternating current power source, in combination with direct reading alternate readout systems, falling within the scope of the invention.

FIG. 1 is a schematic representation of a direct current energized conventional electrolytic reduction cell employing a pair of dimensionally similar alternating current energized sensing electrodes connected in electrical circuitry with two embodiments or forms of readout systems falling within the scope of the invention. Therein a pair of essentially carbon, substantially dimensionally identical, sensing electrodes 10 are suitably supported by a floating pontoon structure 12 to each extend a predetermined distance into the fused liquid electrolyte bath 14 of a conventional direct current energized electrolytic reduction cell, such as a Hall aluminum reduction pot. An alternating current power source 16, through leads 18, supplies current to the impedance 20 in electrical circuitry with a readout system in the form of a current time-amperage waveform oscilloscope 22. A time-voltage waveform oscilloscope 24, connected across the leads 18, can also be provided as an alternative readout system.

In practice, either of the oscilloscopes 22 and 24 is separately employable as the readout means for obtaining intensity values of the anode effects induced on each sensing electrode 10, whether they be measured in terms of current changes by oscilloscope 22, or voltage changes by oscilloscope 24, and an impressed alternating current voltage on the sensing electrodes of between 65 and 75 volts, regulated to be substantially free from harmonics, has performed satisfactorily.

Figure 2:
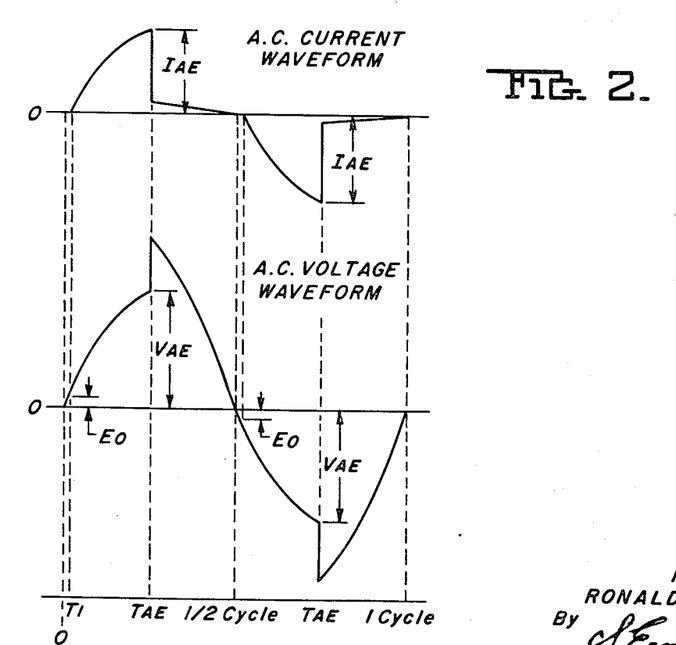
FIG. 2 represents a graph illustrating alternating current and voltage waveforms representative of readout values obtainable by the apparatus of FIG. 1.

Reference to the current and voltage waveforms in FIG. 2, and first considering the upper current waveform curve or plot as representing one readout system under the invention, it will be observed that the amount or intensity of electrical charge per unit wetted area of an anodic sensing electrode on an ampere-seconds basis, flowing across each immersed sensing electrode interface from time zero to the occurrence of induced anode effect, as determinable by alternating current ampere oscilloscope 22, is equivalent to the area under the current waveform plot or curve between the zero and anode effect time limits divided by the electrolyte or bath-wetted, anodic sensing electrode area. This area is proportional to the alumina or solute concentration of the cell electrolyte or bath and is mathematically solvable to be equal to the integral of the current waveform between the time limits zero and occurrence of induced anode effect or $T_{AE}$, expressed by the equation:

$$(1) \quad Q = \frac{I_M}{A} \int_0^{T_{AE}} \sin T \, dt$$

where
$Q$ = electrical charge in ampere-seconds
$I_M$ = maximum or peak current of sine current waveform
$T$ = time at any instant in degrees or radians
$A$ = wetted anodic sensing electrode area The integral of Equation 1 is:

$$(2) \quad Q = \frac{-I_M}{A}(-1 + \cos T_{AE})$$

The maximum current $I_M$ cannot be measured. On the other hand, the current $I_{AE}$ value can be measured on occurrence of induced anode effect. This relationship between $I_M$ and $I_{AE}$ is expressed by the equation:

$$(3) \quad I_{AE} = I_M \sin T_{AE} \text{ or } I_M = \frac{I_{AE}}{\sin T_{AE}}$$

Substituting Equation 3 in Equation 2:

$$(4) \quad Q = \frac{-I_{AE}}{A} \frac{(-1 + \cos T_{AE})}{(\sin T_{AE})}$$

In final determination:

$$(5) \quad Al_2O_3 = KQ = K \frac{I_{AE}}{A} \frac{(-1 + \cos T_{AE})}{\sin T_{AE}}$$

where $Al_2O_3$ is the alumina or solute concentration in the cell bath and $K$ is a proportionality constant.

All of the factors, with the exception of the alumina concentration in Equation 5, are available in practicing the method of the invention under the alternating current waveform analysis expressed by Equations 1 through 5. For example, K, the proportionality constant in Equation 5, is an experimentally determined value and its accuracy depends upon the amount of data accumulated in the operation of cells employing the current waveform anode effect system. $I_{AE}$ and $T_{AE}$ are measured by the oscilloscope 22 of FIG. 1. The electrolyte wetted anode sensing electrode area A is dependent on the dimensional size and immersion depth of each of the sensing electrodes 10 in FIG. 1.

Referring now to the alternate solute concentration determination under the voltage waveform principal represented by the lower curve or plot of FIG. 2, and the readout value determinable by the alternating current voltage oscilloscope 24 in FIG. 2, it will be observed that the aforesaid illustrated voltage waveform (FIG. 2) across sensing electrodes 10 (FIG. 1) increases with time until an anode effect is produced on the anodic sensing electrode while the current waveform suddenly drops with a resultant reduction in the IR voltage drop on the ballast or series impedance 20. At this point, maximum available alternating current voltage is applied to the sensing electrodes 10 and the voltage waveform exhibits a sudden peak rise in voltage. Examination of FIG. 2 reveals that, prior to the occurrence of induced anode effect, both the alternating current and voltage increase sinusoidally. This is explainable by the fact that the resistance of the impressed alternating current in the sensing electrode circuit (FIG. 1) remains constant up to the occurrence of induced anode effect. Hence a correlation exists between current and voltage, as shown in FIG. 2, during the constant resistance period, which is expressable by the equation:

(6) $$\frac{T_{AE}}{R} = \frac{V_{AE} - E_0}{R} = \frac{V_{AE} - E_0}{r/A}$$

where $V_{AE}$ is the impressed voltage across the sensing electrodes 10 immediately prior to induced anode effect thereon (FIG. 2); $E_0$ is the back electromotive force (approximately 1.62 volts for an impressed 60-cycle alternating current), which is also known as the polarized reaction voltage present in an electrolytic system; R is the overall resistance across sensing electrodes 16; and r is the specific resistivity of the fused electrolyte 14 (FIG. 1) across the sensing electrodes 10.

Substituting Equation 6 in Equation 5:

(7) $$Al_2O_3 = \frac{-K(V_{AE} - E_0)}{r} \frac{(-1 + \cos T_{AE})}{(\sin T_{AE})}$$

establishing the alternating current impressed voltage waveform readout system (FIGS. 1 and 2) for determining alumina solute concentration in an electrolytic reduction cell, where K has been previously determined, as stated under Equation 5; $V_{AE}$ and $T_{AE}$ are measured by the alternating current voltage oscilloscope 24 and illustrated in FIG. 2; and r is determinable from the composition and temperature of the electrolyte in the reduction cell, as influenced in an aluminum reduction cell by the ratio of sodium fluoride to aluminum fluoride within the electrolyte, the alumina and calcium fluoride content thereof, and content of such additives as lithium fluoride and/or magnesium fluoride.

Figure 3:
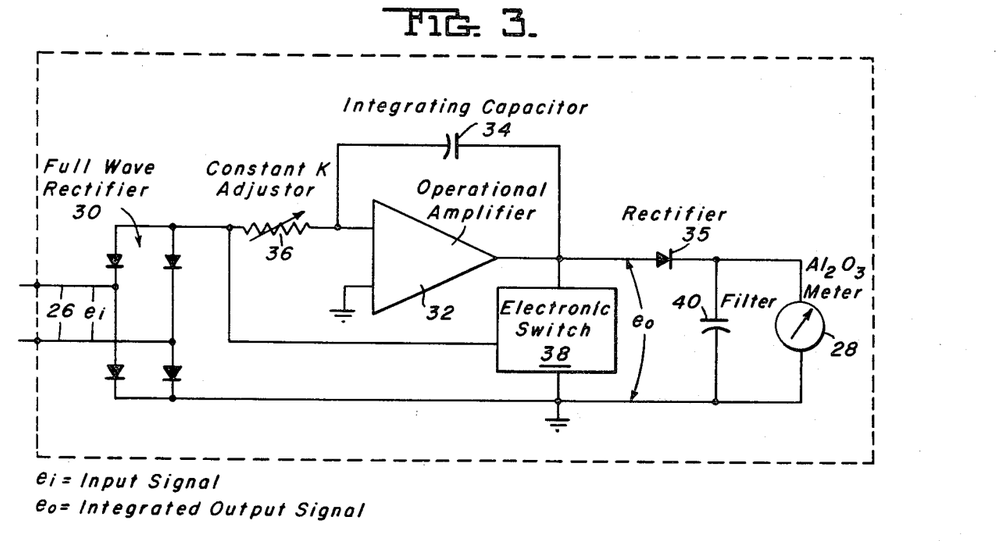
FIG. 3 represents a schematic block-and-legend electrically energized and integrated circuitry and meter readout system employable for direct reading solute concentration determinations in terms of the current and voltage oscilloscope circuits of FIG. 1.

Although either of the oscilloscope circuitry methods and calculations described and explained above can be employed in determining solute concentration within the concept of the invention, it is desirable to provide a readout system integrated with either of the oscilloscopes 22 and 24 each of which receives and automatically relates the intensity of induced sensing electrode anode effects in terms of solute or alumina concentrations. FIG. 3 is one automatic readout system, but is obviously not the only system for this purpose.

In the block-and-legend schematically illustrated readout system of FIG. 3, the direct reading $Al_2O_3$ solute meter 28, and its integrated electrical circuitry and instrumentation would be associated by conductor leads 26 in parallel with the electrical input to either of the current and voltage waveform oscilloscopes 22 and 24. Meter 28 is equipped with an analog type computer comprising a full wave rectifier 30 and operational amplifier 32 provided with a feedback loop incorporating an integrating capacitor 34 and variable resistor 36, which electronically serve to compute the integral of the input signal to either oscilloscope 22 or 24. It will be observed from FIG. 3 that the variable resistor 36 functions as a constant K adjustor and that an electronic switch 38, preferably of the sensitive "flop-flop" type, is connected across the output from the operational amplifier 32 to short circuit such output and prevent its integration with the input signal following occurrence of each induced anode effect (FIGS. 1 and 2).

The output thus obtained from the operational amplifier 32 is delivered to the meter 28 which is preferably provided with a filter capacitor 40 shunted across its leads for the purpose of holding the meter reading constant until a succeeding integrating cycle. A wave rectifier 35 is also provided in the circuitry of FIG. 3.

It will be understood that the internal circuitry of the operational amplifier 32 and electronic switch 38 may assume an infinite number of alternative wiring and electronic module installations, and that the block-and-legend showing of FIG. 3 has been selected for illustration only.

It will be manifest from the description of the invention thus far that a pair of sensing electrodes, or numerical multiple thereof, under alternating current energization or excitation in accordance with the invention, will yield high speed readout of solute concentrations of relatively high reliability, as compared to the above acknowledged direct current energized pilot anode system. In this regard, a prior art direct current energized pilot anode cannot be expected to be any more reliable than its frequency of energization, a matter of minutes when compared to the rapid cyclic alternating current energized sensing electrodes of the present invention, where the cyclic directional change in the impressed alternating current tends to insure a clean electrode surface because of the fact that any products formed on the immersed sensing electrodes during any half cycle of impressed alternating current are converted back to their respective constituents during the next half cycle so that effectively all the electrical energy associated with the passage of current between the sensing electrodes is transformed into heat energy, thus maintaining the electrodes warm enough to obviate formation of a frozen film of electrolyte on the wetted surfaces of the immersed sensing electrodes.

Supporting structure for the sensing electrodes is also essential to the practice of the invention. Embodiment of solute determining apparatus, falling within the scope of the invention, will be found on reference to FIGS. 4, 5 and 6.

Figure 4:
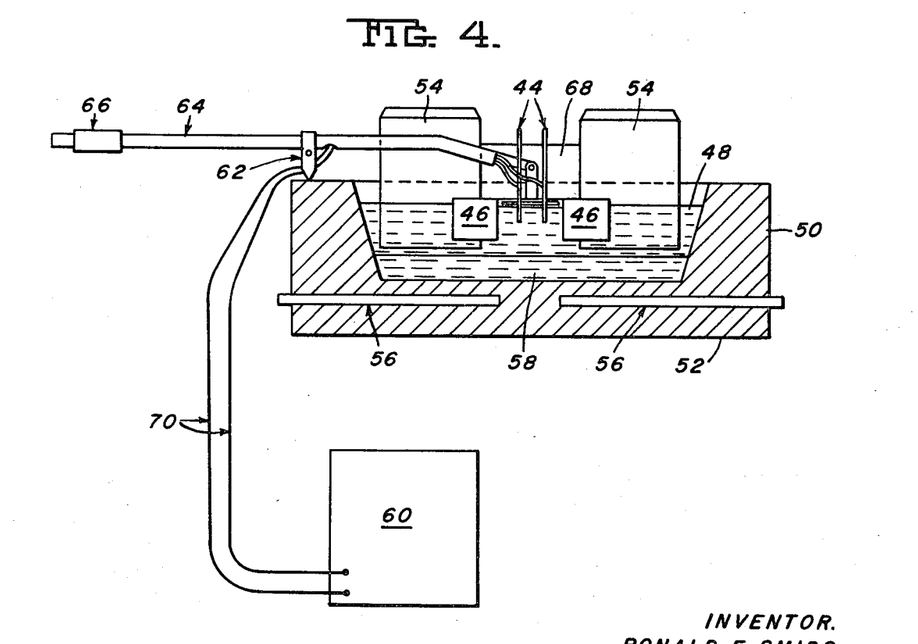
FIG. 4 represents a fragmentary partial cross-sectional elevational view of a conventional aluminum producing direct current energized electrolytic reduction cell incorporating a pair of alternating current energized sensing electrodes in somewhat diagrammatic form.

FIG. 4 is more or less diagrammatic. However, it will be observed that a pair of dimensionally equal sized sensing electrodes 44 are supported by bouyant means 46 floatable in the electrolyte bath 48 of a direct current energized electrolytic reduction cell 50. The cell 50 is conventional and comprises electrically conductive side and bottom cathode lining 52 defining the crater of the cell. Direct current energized anodes 54 and collector bars 56, the latter embedded in the bottom conductive lining 52, complete the productive direct current energization of the cell 50, and in the case of an aluminum reduction cell, the molten cathode aluminum pool 58 collects in the bottom of the cell crater and supports the overlying fused liquid cryolite and alumina electrolyte layer or bath 48. The sensing electrodes 44 are energized from a conventional alternating current power source 60 and the buoyant support means 46 therefor is adjustably supported on a fulcrum 62 by the outwardly extending tubular lever handle or arm 64 carrying an axially slidable counterweight 66 to provide adjustable and controllable depth of extension and immersion of the sensing electrodes 44 within the electrolyte fused bath 48. A heat shield 68 is also preferably provided as protection for the sensing electrodes and electrically insulated leads 70 thereto from heat radiation generated by the cell.

Figure 5:
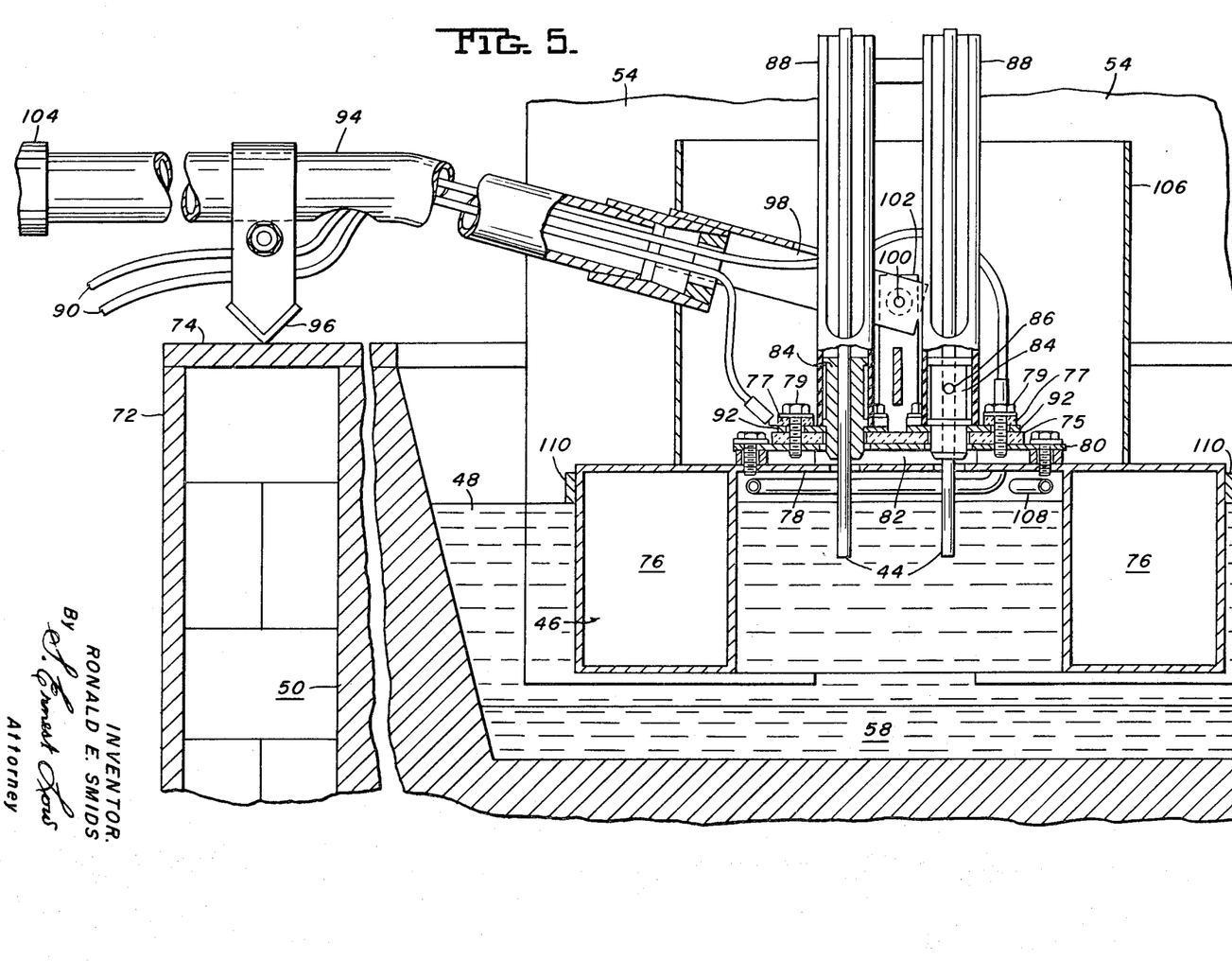
FIG. 5 represents a fragmentary partial cross-sectional elevational view of the apparatus of FIG. 4 in more detail and to an enlarged scale.
Figure 6:
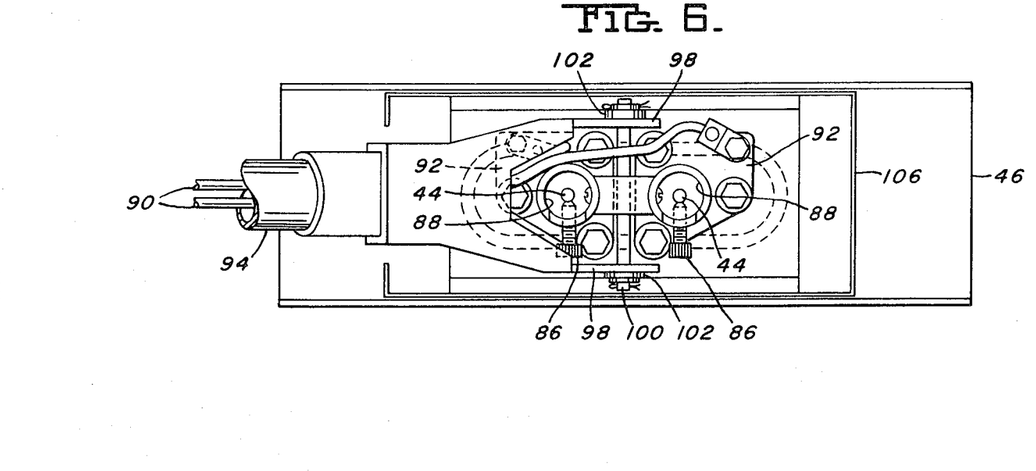
FIG. 6 represents a plan view of the alternating current energized sensing electrodes of FIG. 5, to reduced scale.

FIGS. 5 and 6 repeat much of the structure of FIG. 4 to enlarged scale and more detail in FIG. 5, and identical reference numerals of FIG. 4 are used to identify similar structure therein. For example, the cell 50 in FIG. 5 is exteriorly shrouded and protected by a steel shell 72 and a top surface marginal steel deck 74, in accordance with conventional practice. In addition, the buoyant supporting means 46 for sensing electrodes 44 comprises laterally spaced tubularly enclosed hollow walls or pontoons 76 supporting an upper deck plate 78 through which the lower ends of the sensing electrodes 44 extend in immersion within the liquid electrolyte bath 48.

A base plate 80 of steel, or like material, is secured in spaced relationship above the upper surface of the deck 78 and provides an open space entry 82 for inspection and/or severing the extended end portions of sensing electrodes 44 in the event the same become erroded and/or partially consumed. The sensing electrodes 44 are otherwise each supported by an electrically conductive holder 84 and an adjustable engaging setscrew 86, with generally tubular electrically insulative protective shielding 88 surrounding each sensing electrode 44.

Alternating current is supplied to the sensing electrodes 44 by electrically insulated leads 90 connected to electrode flanges 92 in electrically conductive circuitry through the holder 84 to each electrode 44.

To insure electrical isolation between sensing electrodes 44 (FIG. 5) with each other, as well as with or through the floatable support 46 therefor, a pad or plate 75 of suitable electrical insulating material, such as a refractory material, is interposed the underside surface of each electrically conductive electrode flange 92 and upper surface of steel plate 80, and an electrical insulating washer 77 is provided under the head of each bolt 79, or equivalent fastener, the latter extending through the washers 77 and pad 75 into threaded engagement with underlying plate 80 to provide secure unitary mounting of the sensing electrodes 44 in respect to the floatable support 46 therefor.

The tubular lever 94, fulcrumed at 96, is bifurcated at 98 and opposite legs of the bifurcation are pivotally secured by cross bolt 100 to upstanding brackets 102 secured on the upper surface of base plate 80. The axially slidable counterweight 104, outboard from the fulcrum 96, adjustably controls or counterbalances the depth of immersion and electrolyte-wetted surface areas of sensing electrodes 44, and a sheet metal or other suitable heat-shielding shroud 106 is also preferably provided in surrounding relationship to the sensing electrodes 44. Also, an electrical resistance type heating element 108 may be optionally provided to insure liquid status and absence of a crusted layer of the electrolyte 48 adjacent the upper surface thereof nearest the electrodes 44, which could otherwise resistively affect the accuracy of readout therefrom.

Visual immersion gages 110, carried on the outboard surfaces of the buoyancy chambers 76, and adjustment of the setscrews 86, provide means for controlling and adjusting the depth of immersion and wetted area of the sensing electrodes 44, in addition to the fulcrum 96 and counterweight 104 mounting structure therefor.

Figure 7:
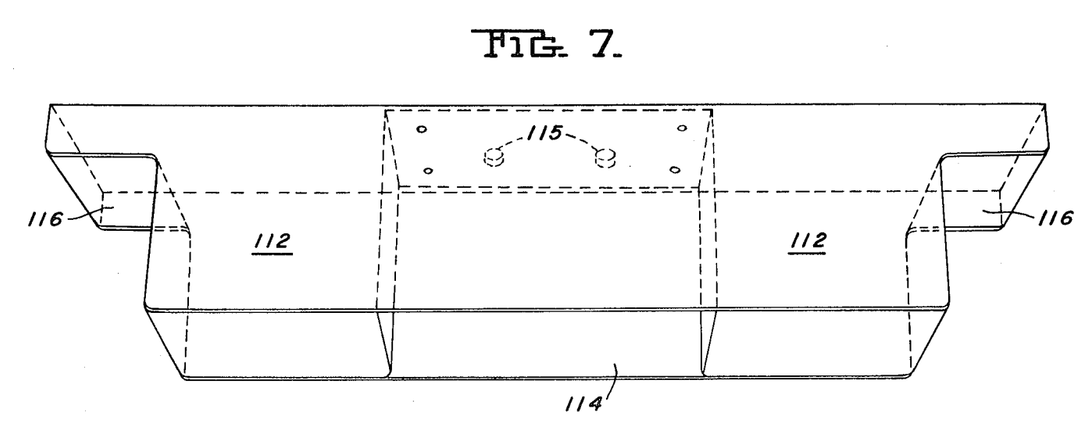
FIG. 7 represents an isometric view of an embodiment of a buoyancy pontoon structure for floatably supporting sensing electrodes of the invention.

FIG. 7 illustrates a step type float or pontoon support for the sensing electrodes 44 of the invention. Herein opposite or lateral chambered or hollow side walls 112 provide a centrally disposed open cavity 114 through upper deck oversize apertures 115 of which the electrodes 44 of FIG. 5 would be extended. Otherwise, the float or pontoon structure of FIG. 7 is provided with opposite lateral preferably hollow extensions 116 which react as stepped shoulders and serve to aid and control the depth of immersion of the sensing electrodes floatably supported thereby.

Figures 8, 9:
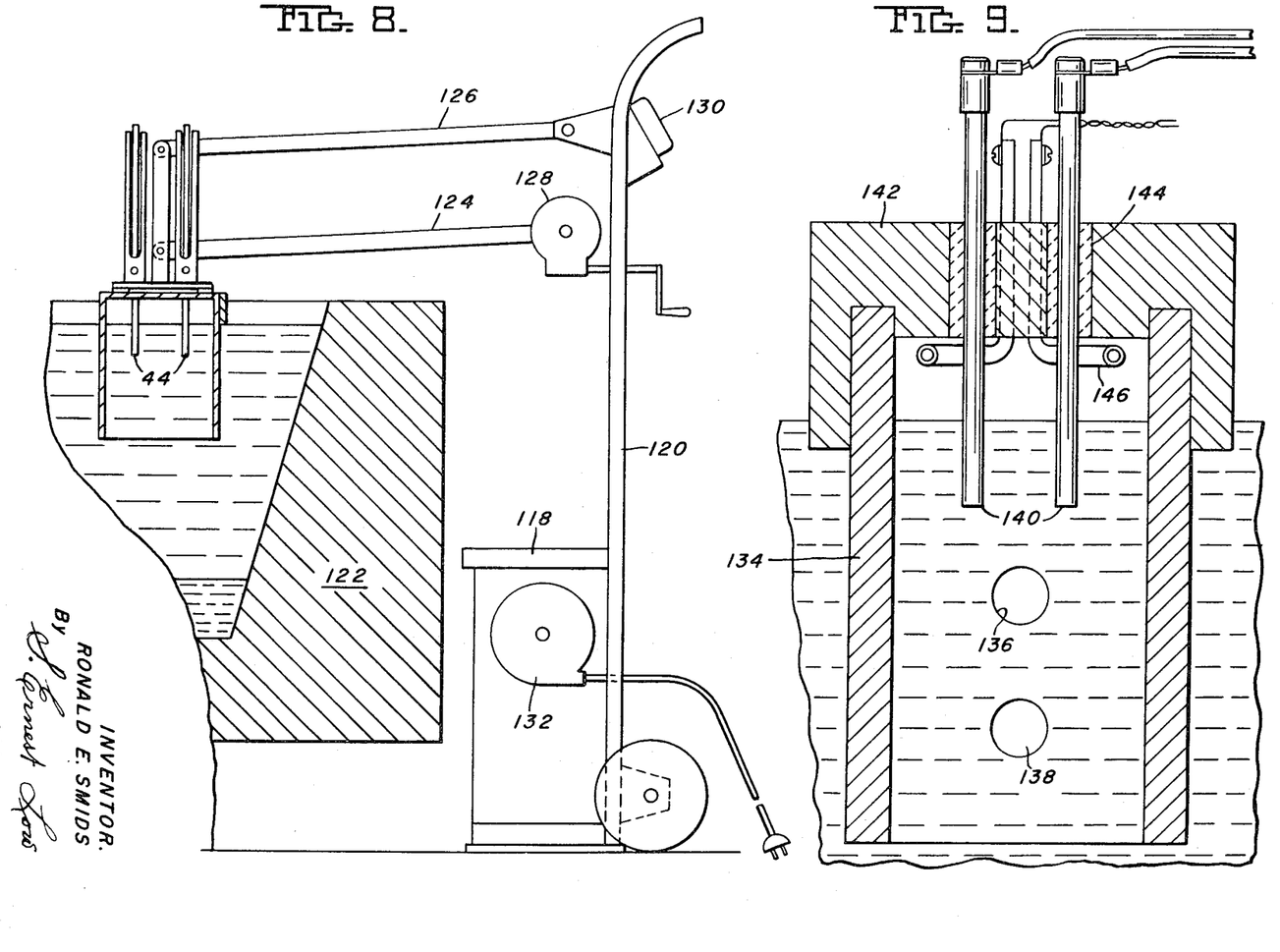
FIG. 8 represents a fragmentary partial cross-sectional elevational view of a portable sensing electrode apparatus.
FIG. 9 represents a fragmentary partial sectional elevation of a statically mounted sensing electrode apparatus.

Since it is not essential that the alternating current energized sensing electrodes of the invention be immersed in the cell electrolyte during the entire production operating cycle of a reduction cell, a portable or translatable supporting mechanism therefor, such as illustrated in FIG. 8, can be provided.

In FIG. 8, the sensing electrodes 44 are buoyantly supported in the same manner as described in FIGS. 4 through 6 with the exception that the electronic readout circuitry and instrumentation 118 thereof is mounted on a translatable means such as a two wheel manually manipulatable conventional industrial truck or hand cart 120, which is movble into and out of operational relationship to an electrolytic reduction cell 122. It will be observed in this respect that a rigid rod or arm 124, pivotally attached at its inner end to the float support for sensing electrodes 44, is mounted at its opposite outer end on the hand cart 120 through a suitable manual crank-operated worm gear drive 128, or the like, which is manipulatable to oscillatably immerse the electrodes within the electrolyte of cell 122. The float support of FIG. 8 may be the same structure as illustrated in FIG. 5. A second rigid arm 126, preferably tubular, is pivotally connected at each of its opposite ends to the electrode float support and hand cart 120, respectively, where a meter 130 is mounted in circuitry with the electronic equipment 118 responding to induced sensing electrode anode effects and determinations, in the manner previously described for the meter 28 (FIG. 3). The alternating current power supply for the portable equipment of FIG. 8 preferably incorporates a conventional insulated conductor reel 132 for plug-in energization as required.

A more or less permanent sensing electrode support may be substituted for the buoyantly floatable and intermittently used supporting means thus far described. An exemplary substitutable support means is illustrated in FIG. 9. Therein a bottom open-end electrically conductive well type housing 134 is mounted to extend into the electrolyte of a reduction cell and can be a permanent integral portion of the cell construction or separately permanently installed therein. Apertures 136 and 138 are preferably provided to insure a uniform circulation of the cell bath or electrolyte through and within the housing 134.

Sensing electrodes 140 are axially adjustably supported at the upper end of housing 134 and are electrically insulated from each other, as previously described for the sensing electrodes of FIG. 5. Actually, the cap 142, supporting the sensing electrodes 140, can be a refractory electrical insulating material with the electrodes 140 supported therein by refractory sleeves 144, and a conventional electrical resistance heater 146 may also be provided, as in FIG. 5.

Regardless of the optional sensing electrode supporting means heretofore described, it is essential that the portions thereof in contact with the cell bath must be electrically conductive to neutralize or avoid competing alternating current paths in the circuitry of the sensing electrodes with the direct current path circuits supplied through the productive anodes of a reduction cell, which could react to affect the sensitivity of the solute determinations in accordance with the invention. In aluminum reduction cells, steel has been found quite satisfactory for the material of the float supports for the sensing electrodes of FIGS. 4 to 8, inclusive, whereas graphite or carbon may be employed for the tubular well-type housing of FIG. 9. In this connection, conventional direct current energized electrolytic aluminum reduction cells regularly develop molten cryolite bath or electrolyte operating temperatures in the 1000° C. range and ferrous materials for the floatably supporting means of the sensing electrodes become coated with a protective layer of the frozen bath during the immersion intervals of the sensing electrodes of the invention.

Although specific embodiments of apparatus have been selected in support of the hereinabove description of the invention, it will be apparent to one skilled in the art that the invention is not to be limited except as defined in the appended claims.

What is claimed is:

1. A method of determining alumina concentration in an aluminum producing electrolytic reduction cell comprising the steps; immersing at least one pair of sensing electrodes in the electrolyte of the cell, impressing an energizing alternating current on said sensing electrodes to produce induced anode effects thereon, and converting said anode effects to electrolyte alumina solute concentrations.

2. A method of determining alumina solute concentration in an alumina producing electrolytic reduction cell comprising the steps; impressing an energizing alternating current on a pair of sensing electrodes immersed in the electrolyte of the cell containing the alumina to induce cyclic alternating anode effects thereon, and communicating the intensity of said induced cyclic anode effects to a readout system correlated in terms of alumina concentrations in the electrolyte.

3. A method in accordance with claim 1 in which each electrode alternately produces an induced anode effect every half cycle of impressed alternating current.

4. A method in accordance with claim 2 in which the intensities of the cyclically induced anode effects are communicated to a direct reading electronically integrated readout system.

5. A method in accordance with claim 4 in which the readout system is calibrated in terms of alumina solute concentrations.

6. A method in accordance with claim 1 in which a 60-cycle alternating current is impressed on the sensing electrodes.

7. A method in accordance with claim 2 in which the induced cyclic anode effects are proportional to an alternating current waveform responsively produced thereby.

8. A method in accordance with claim 2 in which the induced cyclic anode effects are proportional to an alternating curernt voltage waveform responsively produced thereby.

9. An apparatus for determining alumina solute concentrations in the fused bath of a direct current energized aluminum producing electrolytic reduction cell comprising;
   (a) an electrolytic reduction cell containing a fused electrolytic bath,
   (b) at least one pair of sensing electrodes immersed within the depth of the fused electrolyte bath of the cell,
   (c) an alternating power source impressed on the sensing electrodes to induce cyclic anode effects thereon, and
   (d) an electronic readout system in responsive integrated circuitry with said sensing electrodes correlating intensities of the induced anode effects in terms of alumina solute concentration in the cell bath.

10. An apparatus in accordance with claim 9 in which each electrode alternately produces an induced anode effect every half cycle of impressed alternating current.

11. An apparatus in accordance with claim 9 in which a pair of sensing electrodes are supported upon a buoyant structure floatable on the fused bath of the cell, and in which the sensing electrodes are axially adjustable in accurate extension thereof within the fused bath of the cell.

12. An apparatus in accordance with claim 9 in which the readout system includes an alternating current waveform oscilloscope.

13. An apparatus in accordance with claim 9 in which the readout system includes an alternating current voltage waveform oscilloscope.

References Cited

UNITED STATES PATENTS

| | | | |
|---|---|---|---|
| 3,317,413 | 5/1967 | Chambran | 204—67 |
| 3,345,273 | 10/1967 | Brown | 204—1.1 |
| 3,392,092 | 7/1968 | Diller | 204—243 |
| 3,400,062 | 9/1968 | Bruno et al. | 204—243 |
| 3,471,310 | 10/1969 | Kibby, et al. | 204—245 |

TA-HSUNG TUNG, Primary Examiner

U.S. Cl. X.R.

204—67, 195, 245

UNITED STATES PATENT OFFICE
CERTIFICATE OF CORRECTION

Patent No. 3,539,456　　　　　　　　Dated November 10, 1970

Inventor(s) Ronald E. Smids

It is certified that error appears in the above-identified patent and that said Letters Patent are hereby corrected as shown below:

On Col. 3, Line 8 change "sensig" to --sensing--.

Col. 3, Line 73 change "eelctrode" to --electrode--.

Col. 4, Line 17 after "the" insert --sensing electrodes 10 through a ballast or series--.

Col. 5, Line 13 change "alternate" to --alternative--.

Col. 5, Line 45 change "16" to --10--.

Col. 6, Line 13 change "flop-flop" to --flip-flop--.

Col. 8, Line 15 change "movble" to --movable--.

Col. 10 in the references change "3,471,310" to --3,471,390--.

SIGNED AND SEALED

FEB 23 1971

(SEAL)
Attest:

Edward M. Fletcher, Jr.
Attesting Officer

WILLIAM E. SCHUYLER, JR
Commissioner of Patents